US012744835B2

(12) United States Patent
Lopez et al.

(10) Patent No.: US 12,744,835 B2
(45) Date of Patent: Sep. 22, 2026

(54) CROSS-PLATFORM DATA REFRESH FOR COMMUNICATION PROCESS FLOWS

(71) Applicant: Salesforce, Inc., San Francisco, CA (US)

(72) Inventors: Alejandro Lopez, San Francisco, CA (US); William Robert Jennings, II, Indianapolis, IN (US); Penny Nicoletta Tselikis, Carmel, IN (US); Justin Louis Condren, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 869 days.

(21) Appl. No.: 18/064,616

(22) Filed: Dec. 12, 2022

(65) Prior Publication Data

US 2024/0195888 A1 Jun. 13, 2024

(51) Int. Cl.

| | |
|---|---|
| ***H04L 67/75*** | (2022.01) |
| ***G06F 3/0483*** | (2013.01) |
| *H04L 67/55* | (2022.01) |

(52) U.S. Cl.

CPC ............ *H04L 67/75* (2022.05); *G06F 3/0483* (2013.01); *H04L 67/55* (2022.05)

(58) Field of Classification Search

CPC ........ H04L 67/75; H04L 67/55; G06F 3/0483

See application file for complete search history.

(56) References Cited

U.S. PATENT DOCUMENTS

2009/0198507 A1* 8/2009 Rhodus .................. G06Q 30/02 705/14.66
2012/0179534 A1* 7/2012 Moukas ............. G06Q 30/0241 705/14.41
2015/0186946 A1* 7/2015 Levi ................... G06Q 30/0251 705/14.43
2019/0147499 A1* 5/2019 Yao .................... G06Q 30/0276 705/14.72
2019/0174156 A1* 6/2019 Crawford ........... H04N 21/2547
2020/0265449 A1* 8/2020 Sundararaj ......... G06Q 30/0276
2020/0294108 A1* 9/2020 Perry ..................... G06N 20/00

* cited by examiner

*Primary Examiner* — Reji Kartholy

(74) *Attorney, Agent, or Firm* — Holland & Hart LLP

(57) ABSTRACT

Methods, systems, apparatuses, devices, and computer program products are described. A communication process flow management service may display a set of actions associated with a communication process flow configured to manage communications for a tenant. To update a segment of entities on which the communication process flow is to be executed, a user may navigate to a separate browser tab from that of the communication process flow management service, and may update the segment using an entity segmentation service. The communication process flow management service may receive an indication from an entity segmentation service that a segment of entities is updated and display a notification or a toast popup indicating the segment update to a user interface.

18 Claims, 10 Drawing Sheets

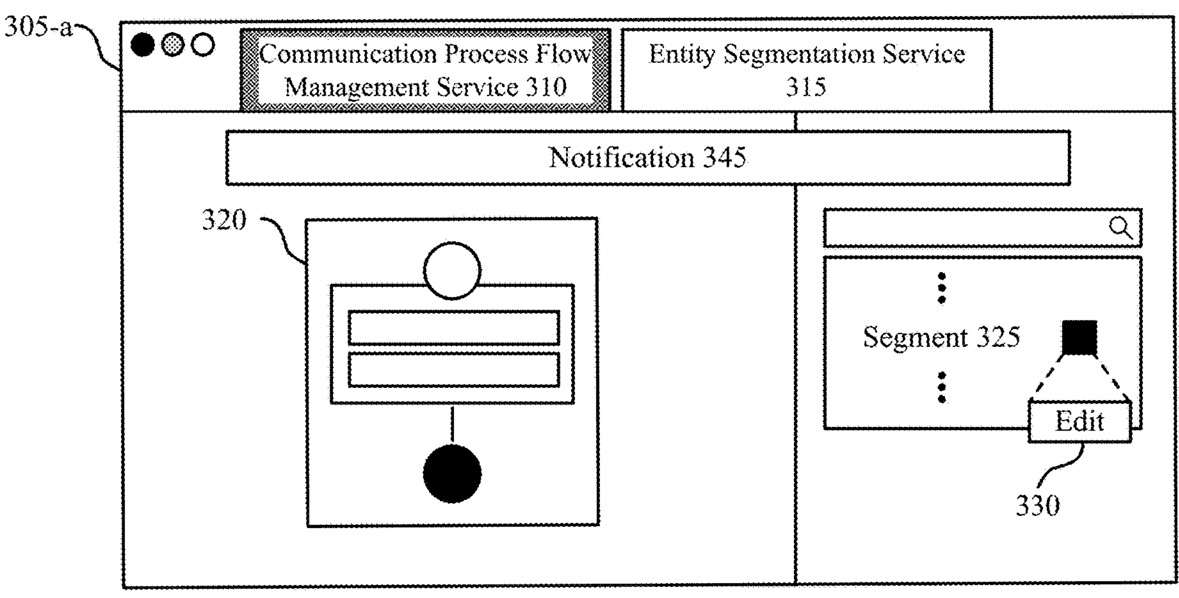
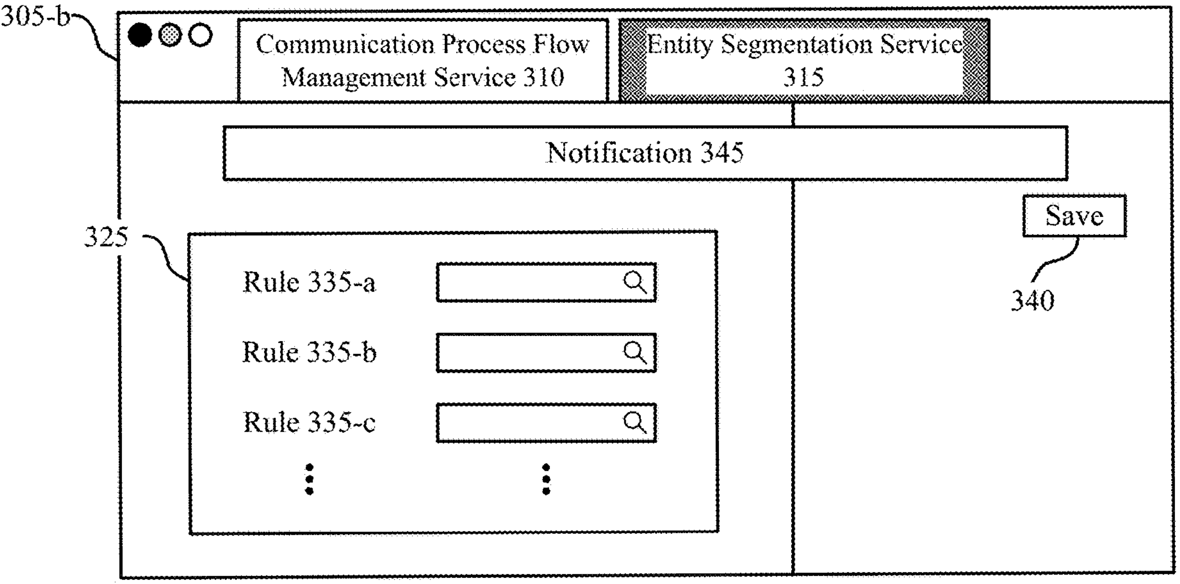
300
FIG. 3

Figure 8:
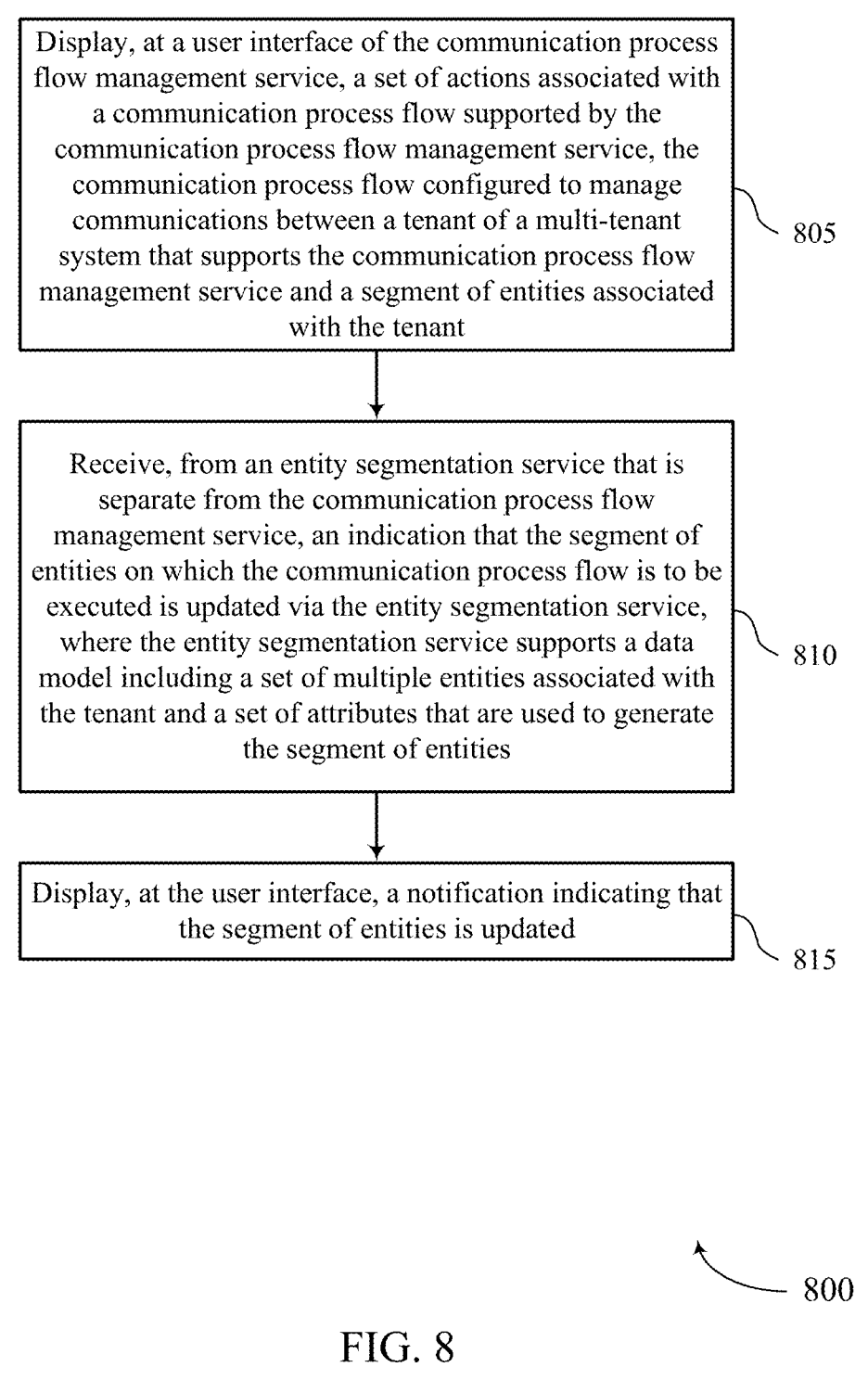

Display, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant

805

Receive, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities

810

Display, at the user interface, a notification indicating that the segment of entities is updated

CROSS-PLATFORM DATA REFRESH FOR COMMUNICATION PROCESS FLOWS

FIELD OF TECHNOLOGY

The present disclosure relates generally to database systems and data processing, and more specifically to cross-platform data refresh for communication process flows.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement a communication process flow that controls communications between a tenant and a set of users or entities (e.g., subscribers). Additionally, a data platform may support segmentation of entities based on attributes associated with the entities, and an entity segmentation service may enable users to create, manage, and update entity segments. To update segment entities for communication process flows, users may navigate back and forth between the communication process flow management service and the entity segmentation service. However, such switching between services may create disorganization, loss of workflow context, and limited visibility. Additionally, users may be unaware of changes made to segments by other users.

BRIEF DESCRIPTION OF THE DRAWINGS

FIG. 3 illustrates an example of a user interface that supports cross-platform data refresh for communication process flows in accordance with aspects of the present disclosure.

FIGS. 8 through 10 illustrate flowcharts showing methods that support cross-platform data refresh for communication process flows in accordance with aspects of the present disclosure.

DETAILED DESCRIPTION

Figure 1:
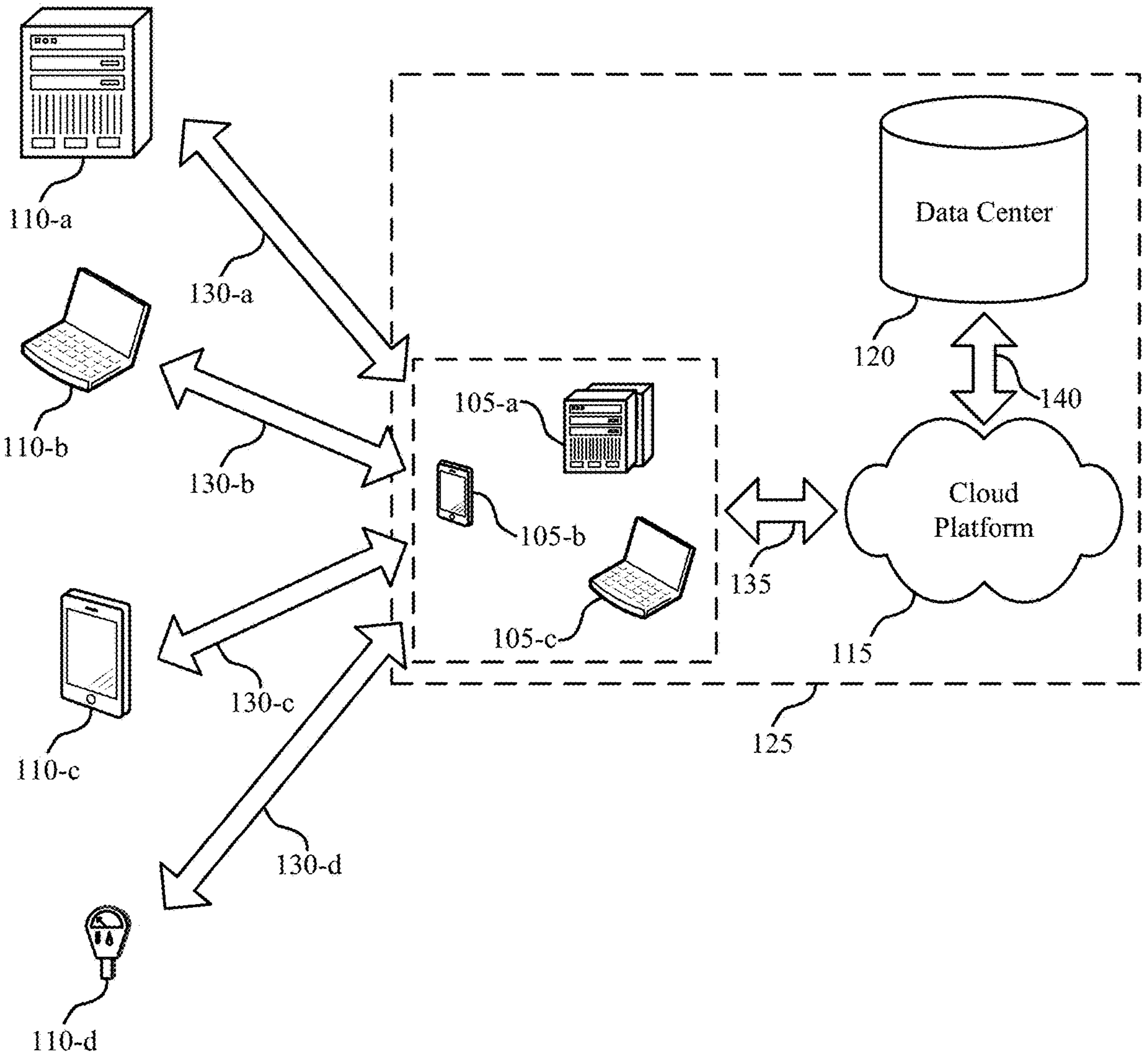
FIG. 1 illustrates an example of a data processing system that supports cross-platform data refresh for communication process flows in accordance with aspects of the present disclosure.

A communication process flow management service may support creation, configuration, management, and deployment of a communication process flow that manages communications between a set of users and a tenant or organization. For example, an organization or tenant may use the communication process flow management service to schedule and manage communications between the organization and the set of users, which may be examples of subscribers, customers, or prospective customers of the organization. Users may receive electronic communications (e.g., emails, messages, advertisements, marketing campaigns) according to a communication process flow. The communication process flow may include various actions and message configurations, and transmission of various communications may depend on user attributes and user web behavior, among other parameters.

A data platform (e.g., customer data platform (CDP)) may support segmentation of entities based on attributes (e.g., age, gender, purchase history) associated with the entities, where the attributes may be identified by ingesting data from multiple data sources. Administrative users or employees associated with the tenant (e.g., a marketing team) may manually or automatically adjust aspects of the communication process flow for communication management, for example, using the data from the data platform. For example, a segment of entities may be generated at the data platform, and the segment and some associated data may be pushed to the communication process flow management service for use in configuring a communication process flow.

Additionally, an entity segmentation service (e.g., Segment Builder) may support updating the segmentation of entities. For example, administrative users or employees associated with the tenant (e.g., a marketing team) may update an entity segment generated at the data platform for use in configuring a communication process flow. The user may update a segment of entities based on updated user attributes and user web behaviors and product information, among other data. Moreover, updating the entity segment may enable users to improve the various actions and message configurations configured for a segment.

Techniques described herein support a cross-platform data refresh for communication process flows, where a user may update entity segments using the entity segmentation service for a communication process flow. Using change data capture (CDC) events or other types of data feeds, a user may use cross-platform calls to live-refresh data between the communication process flow management service and the entity segmentation service. Based on the refreshed data, the user may update an entity segment for a communication process flow and see the results of the update reflected in the communication process flow management service. In this way, the user may automatically navigate between the communication process flow management service and the entity segmentation service via respective browser tabs, or a same browser tab, without exiting either platform. Additionally, the communication process flow management service may display notifications, such as toast popups, via a user interface when an entity segment has been updated. In some cases, the communication process flow management service may maintain a log of updated to entity segments such that a user may reference or revert previous changes.

Cross-platform data refresh for communication process flows, as described herein, may support improved organization, increased visibility to updates, and improved workflow context, among other benefits. For example, as the techniques described herein support automatically navigating between a communication process flow management service and an entity segmentation service within a same or different browser tabs, the techniques may support improved workflow efficiencies and organization by enabling a user to keep the communication process flow management service open. Additionally, as the described techniques support displaying toast popups to the user indicating entity segment updates, the techniques support increased visibility and improved context regarding the history of a communication process flow such that users may more accurately configure actions and communications for different segments.

Aspects of the disclosure are initially described in the context of an environment supporting an on-demand database service. Aspects of the disclosure are then described in the context of computing architectures, user interfaces, and process flows. Aspects of the disclosure are further illustrated by and described with reference to apparatus diagrams, system diagrams, and flowcharts that relate to cross-platform data refresh for communication process flows.

FIG. 1 illustrates an example of a system 100 for cloud computing that supports cross-platform data refresh for communication process flows in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

One or both of the cloud platform 115 or the subsystem 125 may support a communication process flow management service, which may be used to configure a communication process flow. As described herein, a communication process flow may control electronic communications (e.g., emails, messages, advertisements) between a tenant (e.g., a cloud client 105) of a multi-tenant system and a set of users (e.g., contacts 110) associated with the tenant. The communication process flow may include various actions that are used to manage these electronic communications. For example, the communication process flow may include emails, decision splits, wait periods, and the like. In addition, the communication process flow may include different routes (e.g., sets of actions) that are configured via the communication process flow management service. Whether a user receives messages via a specific route may depend on attributes or behaviors of a user (e.g., interests, activity patterns, demographic information). These attributes may be stored in association with user identifiers at the data center 120.

Communication process flows may be configured by teams of administrators or users associated with the tenant (e.g., employees of an organization corresponding to the tenant). For example, these users may perform various activities related to configuring, reviewing, activating, and monitoring communication process flows using the communication process flow management service. In some cases, the users associated with the tenant may use attribute data from a data platform (e.g., CDP) at the data center 120 to inform a configuration of the communication process flow. For example, the data platform may support segmentation of entities based on attributes associated with the entities, where the attributes may be identified by ingesting data from multiple data sources. For example, a segment of entities may be generated at the data platform, and the segment and some associated data may be pushed to the communication process flow management service.

Additionally, one or both of the cloud platform 115 or the subsystem 125 may support an entity segmentation service (e.g., Segment Builder), which may be used to update segments of entities. For example, administrative users or employees associated with the tenant (e.g., a cloud client 105) may update an entity segment generated at the data platform for use in configuring a communication process flow. The user may update a segment of entities based on updated user attributes and user web behaviors and product information, among other attribute data stored at the data center 120.

In some examples, to update segment entities for communication process flows, users may switch back and forth between the communication process flow management service and the entity segmentation service. For example, the user may navigate from the communication process flow management service to the entity segmentation service, make and save changes to entity segments, navigate back to the communication process flow management service, and refresh the user interface to see the results of the changes reflected in a communication process flow. However, such switching between services may create disorganization, loss of workflow context, and limited visibility. Additionally, users may be unaware of changes made to segments by other users (e.g., teammates on a marketing team).

To improve organization, visibility, and workflow efficiency associated with updating entity segments, the data processing system 100 may support a cross-platform data refresh for communication process flows, where a user may update entity segments using the entity segmentation service for a communication process flow. The communication process flow management service may display a set of actions associated with a communication process flow at a user interface. As described herein, the communication process flow may be configured to manage communications between a tenant (e.g., a cloud client 105) of a multi-tenant system that supports the communication process flow management service and a segment of entities associated with the tenant. The communication process flow management service may receive an indication that a segment of entities on which the communication process flow is to be executed is updated from an entity segmentation service. The entity segmentation service may support a data model including a set of entities and corresponding attributes. The communication process flow management service may display a toast popup or other notification at the user interface indicating the update. As such, a user may automatically navigate between the communication process flow management service and the entity segmentation service to update a segment of entities.

In some examples, the segment of entities may include users (e.g., customers, subscribers) subscribed to a website. The segment of entities may be associated with attributes such as first name and last name, purchase history, and rewards status, among other attributes. A user of a tenant or organization supporting the website (e.g., a marketer) may configure an action in a communication process flow, which may trigger the communication process flow management service to send an email advertising running shoes to a segment of entities between ages 20 and 30. As the user configures the communication process flow, the user may wish to update the segment of entities to include ages 30 to 40 instead of 20 to 30. For example, the user may gather updated customer attribute and product information indicating that customers aged 30 to 40 are more likely to purchase the running shoes. The user may use the techniques described herein to navigate from the communication process flow management service to the entity segmentation service, change a numeric value of a rule associated with the segment (e.g., from between ages 20 and 30, to between ages 30 and 40), save the updated ages (resulting in an updated segment), and navigate back to the communication process flow management service to execute the communication process flow, which automatically accounts for the updated segment.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
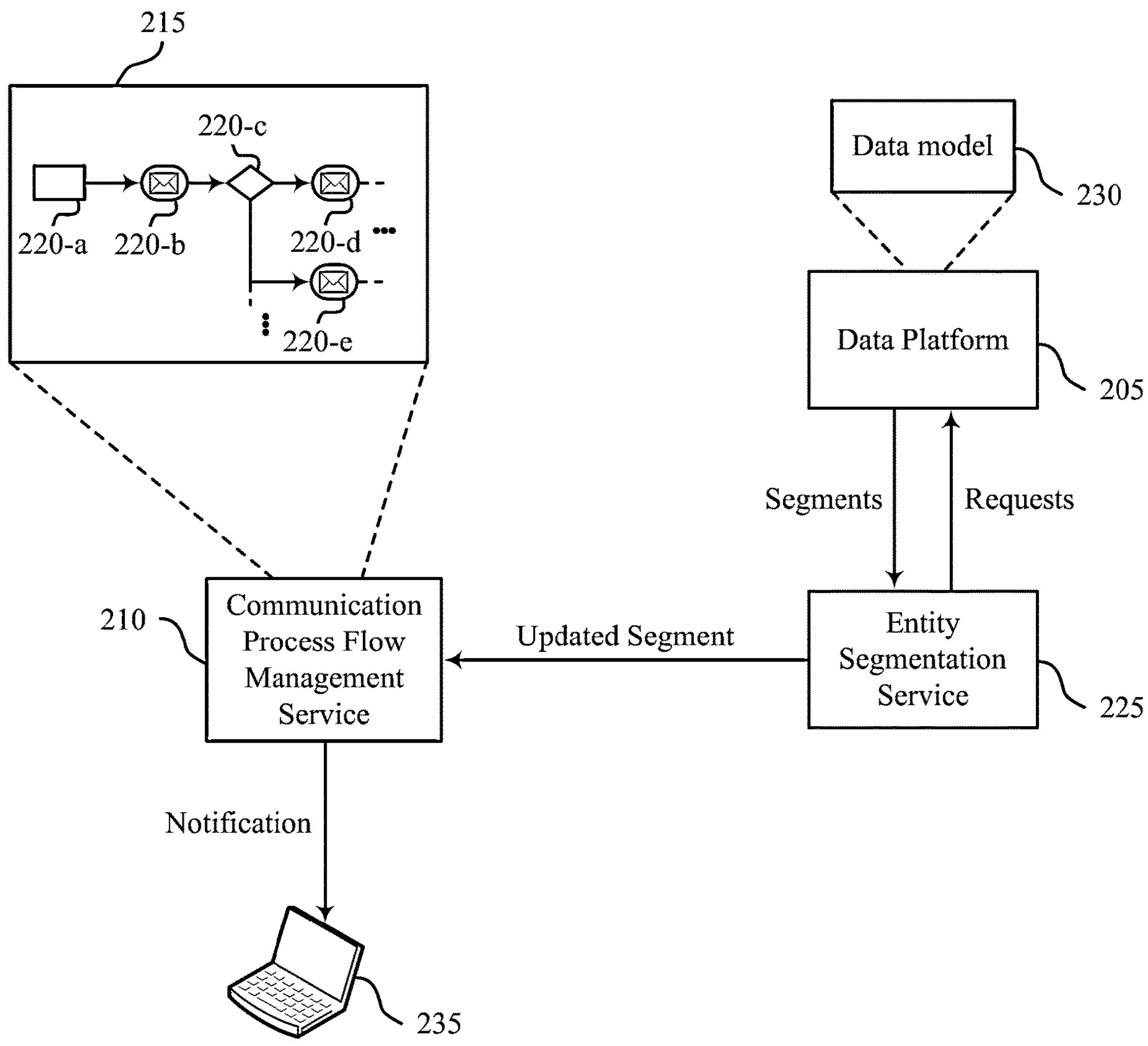
FIG. 2 illustrates an example of a computing architecture that supports cross-platform data refresh for communication process flows in accordance with aspects of the present disclosure.

FIG. 2 illustrates an example of a computing architecture 200 that supports cross-platform data refresh for communication process flows in accordance with aspects of the present disclosure. The computing architecture 200 may implement or be implemented by aspects of the data processing system 100. For example, the computing architecture 200 may include a data platform 205, a communication process flow management service 210, and an entity segmentation service 225, each of which may be implemented by aspects of a cloud platform 115 or a subsystem 125 described with reference to FIG. 1. In some examples, the systems or servers supporting the data platform 205 may include computing systems that are logically or physically separated from systems or servers supporting the communication process flow management service 210, the entity segmentation service 225, or both. It should be noted that the techniques described herein may apply to other platforms, such as the communication process flow management service 210 and an email service (e.g., Email Builder).

As described herein, the communication process flow management service 210 may support creation, configuration, and implementation of various communication process flows (e.g., a communication process flow 215) that control electronic communications between a tenant and a set of users associated with the tenant. For example, users associated with the tenant may use the communication process flow management service 210 to perform actions (e.g., actions 220) that include processor-executable instructions for management of electronic communications. For example, an action 220-*a* may include instructions that, when executed by a processor, selects users (e.g., customers) for the communication process flow 215. That is, the action 220-*a* may define a rule for determining whether users are to receive electronic communications in accordance with the communication process flow 215 (e.g., an event entry). The rule may be based on various attributes and behaviors (e.g., demographic information, web activity patterns, purchase history) of the users. For example, users that have purchased a product from the tenant (or an organization associated with the tenant) in the last six months may receive electronic communications from the tenant in accordance with the communication process flow 215. Users that do not satisfy this criteria may not receive electronic communications in accordance with the communication process flow 215.

Other actions 220 may define message transmission schemes, decision splits, and other related processes. For example, each user that satisfies a rule defined by the action 220-*a* may receive an email according to an action 220-*b*. The action 220-*b* may include specific content that is to be transmitted to the users (e.g., via email). Similarly, an action 220-*c* may define a decision split between users. For example, users that have opened an email corresponding to the action 220-*b* may be routed to an action 220-*d*, while users that have not opened the email corresponding to the action 220-*b* may be routed to an action 220-*e*. Additionally, or alternatively, the action 220-*c* (e.g., a decision split) may utilize other attributes and behaviors to route users through the communication process flow 215.

In some examples, the communication process flow management service 210 may display, at a user interface, a set of actions 220 associated with the communication process flow 215. The communication process flow 215 may be configured to manage communications between a tenant of a multi-tenant system that supports the communication process flow 215 and a segment of entities associated with the tenant. In some examples, the segment of entities may be generated by the data platform 205. The data platform 205 may support segmentation of entities based on attributes associated with the entities, where the attributes may be identified by ingesting data from multiple data sources such as email records, mobile application data, geolocation data, and website activity, among other data sources. In addition, the data platform 205 may support a data model 230, which may enable the data from the multiple data sources to be segmented and analyzed. Users of a tenant or an organization (e.g., a marketing team) may store large amounts of records and user profiles in the data platform 205. A schema of the data model 230 (e.g., a Cloud Information Model (CIM)) and attribute data stored at the data platform 205 may be available for use in the communication process flow 215. For example, a user of the tenant may use the schema of the data model 230 or the attribute data to configure actions 220 of the communication process flow 215 and route users (e.g., customers, subscribers) via a particular path of the communication process flow 215.

In some examples, a user may select a segment of entities on which the communication process flow 215 is to be executed. The user may indicate a user input (via a user interface corresponding to the communication process flow management service 210) indicating the selection of the segment of entities. Additionally, the user may change or update the segment of entities on which the communication process flow 215 is to be executed. For example, the user may update the segment of entities to improve a marketing campaign, or if an original configuration of the segment included errors, among other reasons. The user may use the entity segmentation service 225 to update the segment of entities, where the entity segmentation service 225 may support a data model 230 (of the data platform 205) including a set of multiple entities associated with the tenant and a set of attributes that are used to generate the segment of entities at the data platform 205. For example, a user associated with the tenant (e.g., a marketing team) may update an entity segment generated at the data platform 205 for use in configuring the communication process flow 215. The user may update a segment of entities using updated user attributes and user web behaviors and product information, among other data. Updating the entity segment may enable users to improve the various actions and message configurations configured for a segment.

The user may select an option to edit the segment of entities, which may trigger the entity segmentation service 225 to transmit an indication that the segment of entities on which the communication process flow 215 is to be executed is being updated to the communication process flow management service 210. In selecting the option to edit (e.g., an "edit" button), the user may be navigated from a first browser tab displaying the user interface of the communication process flow management service 210 to a second browser tab displaying a user interface of the entity segmentation service 225. That is, a user may navigate or be redirected between the communication process flow management service 210 and the entity segmentation with a singular "edit" button in a side panel (e.g., a Segment element side panel) in the user interface of the communication process flow management service 210.

When the user navigates to the second browser tab, the user may use the entity segmentation service 225 to update the segment of entities. For example, the user may change one or more rules for the segmentation. The entity segmentation service 225 may request updated customer attribute and behavioral data from the data platform 205 (which may be a data lake), traverse a schema of the data model 230 of the data platform 205, and return a count or any other data back to the communication process flow management service 210 such that the updated information may be applied to the communication process flow 215. Such a cross-platform, live data refresh may take less than 5 seconds for hundreds of thousands of data points.

In some examples, updating the segment of entities may include updating actions 220 of the communication process flow 215, such as email blasts. The communication process flow management service 210 may receive an indication that an action 220 associated with the communication process flow 215 is updated based on the segment of entities being updated. For example, a segmentation rule may be updated to specify that the segment spans customers aged 30 to 40 (instead of 20 to 30). As such, a decision split of the communication process flow 215 may be updated to send different marketing campaigns to customers who are within the 30 to 40 age-range versus outside of it. Additionally, or alternatively, the communication process flow management service 210 may receive an indication that an email object associated with the communication process flow 215 is updated in another platform, such as a content platform. The communication process flow management service 210 may update the actions 220 associated with the communication process flow 215 based on receiving the indication of the updated segment, action 220, email object, or any combination thereof. Additionally, when all of the relevant segments and corresponding data of the communication process flow 215 are updated, the communication process flow management service 210 may execute the communication process flow 215. That is, the communication process flow 215 may be in a draft form when the segment is updated.

The communication process flow management service 210 may use change data capture (CDC) to receive the indication of the updated segment of entities. In some aspects, the communication process flow management service 210 may subscribe to a change event feed associated with the segment of entities, the entity segmentation service 225, or both. For example, the communication process flow management service 210 may subscribe to an event feed that indicates a creation, modification, or update of the segment. When the communication process flow management service 210 detects an event, the communication process flow management service 210 may receive the indication that the segment of entities on which the communication process flow 215 is to executed in updated. Then, the communication process flow management service 210 may refresh the data of the communication process flow 215 such that it is executed for the updated segment of entities. Using CDC events in this way, the computer architecture 200 may support cross-platform calls to live refresh the data between the communication process flow management service 210 and the entity segmentation service 225 to enable users to seamlessly edit their segments using the entity segmentation service and see results of the edits reflected in the communication process flow management service 210.

In some cases, the communication process flow management service 210 may receive the indication from a service layer, where subscription to the change event feed, or another type of feed, may also be via the service layer. In this way, the communication process flow management service 210 may only detect events associated with the segment of entities that are being changed. The communication process flow management service 210 may use multiple services for different functions (e.g., to fetch data, to update segments, etc.). The service layer may manage a caching mechanism and route data through the communication process flow management service 210 for configuring the communication process flow 215. As such, the communication process flow management service 210 may use a service (via the service layer instead of the communication process flow management service 210 itself) to subscribe to the change event feed. In some examples, the communication process flow management service 210 may indicate to the service what entities require updated data, and the service may create and manage the subscription to those entities using CDC change events, such that the data of the communication process flow 215 may be updated as soon as the service layer receives an indication of an update to the segment of entities. The service may then notify or push out the updated data to the communication process flow management service 210. For example, the CDC and/or the service layer techniques may be used to indicate changes between various systems of a cloud platform (e.g., could platform 115 of FIG. 1). As described herein, the communication process flow management service may receive an indication that email content for one of the actions 220 is updated, and the indication may be received via the CDC technique or via the service layer technique from a content platform, as described herein. In this way, the subscription process and other services may be decoupled from the communication process flow management service 210, which may increase efficiency of communications within the computing architecture 200.

After receiving the indication, the communication process flow management service 210 may automatically display a notification indicating that the segment of entities is updated at the user interface of the communication process flow management service 210 (in the first browser tab). In some cases, a user may view the user interface via a user device 235. The notification may include a toast popup, a banner message, or some other popup message that indicates changes that were made to the segment (e.g., in a separate builder). Additionally, the notification may include a different message based on who updated the segment. For example, the notification may indicate that the current user just updated the segment, or the notification may indicate that a different user made a prior change to the segment after the segment was last saved by the current user. Additionally, or alternatively, the notification may indicate a time stamp at which the segment was last updated, a user identifier, one or more fields that were updated, field names, updated values, record identifiers, or a type of action (e.g., create, update, delete), among other information. In some examples, the notification may be included in the change event feed detected by the communication process flow management service 210.

In some examples, the communication process flow management service 210 may log one or more updates to the segment of entities in response to receiving the indication (or detecting a change event). The notification may indicate previous changes to the segment by the same or different users based on retrieving information from the log, such that the notification may appear for different users on different user devices. In addition, a user may use the logged updates to revert previous changes that may be incorrect or no longer needed. In this way, the described techniques may create more visibility for different users configuring a same communication process flow 215.

In an example, a user (e.g., a marketer) may use the communication process flow 215 to promote a new premium product their company is offering. The user would like to send an email campaign to all customers (e.g., entities) who have spent more than $10,000 at her company in the past year. When configuring the communication process flow 215, the user may identify a typo in the segment rules (which configure the segment of entities), making the segment a list of customers who have spent less than $10,000 at the company in the past year. The user may use the techniques described herein to quickly fix the rule within the communication process flow management service 210 before configuring additional actions 220 of the communication process flow 215.

In another example, a user (e.g., a marketing manager) may configure the communication process flow 215, which has not been activated yet. Since the last time the user worked on the communication process flow 215, another user may have made changes to the segment on which the communication process flow 215 is to be executed. When the user selects a segment element (e.g., displayed in a side panel of a user interface of the communication process flow management service 210), the user interface may display a banner notification or a callout that indicates the changes made by the previous user. As such, the user may be informed of previous changes to the segment.

FIG. 3 illustrates an example of a user interface 300 that supports cross-platform data refresh for communication process flows in accordance with aspects of the present disclosure. The user interface 300 may implement or be implemented by aspects of the data processing system 100 and the computing architecture 200. For example, the user interface 300 may include a browser tab 305-*a* (e.g., a first browser tab) displaying a user interface of a communication process flow management service 310 and a browser tab 305-*b* (e.g., a second browser tab) displaying a user interface of an entity segmentation service 315. The communication process flow management service 310 and the entity segmentation service 315 may be examples of corresponding platforms described herein.

In some examples, an administrative user or employee associated with a tenant of a multi-tenant system may use the communication process flow management service 310 to configure or build a communication process flow 320, as described herein with reference to FIG. 2. The user may use a lookup component to search for and select a segment 325 as an audience of the communication process flow 320. The entities included in the audience may receive marketing and other communications in accordance with the communication process flow 320 when it is executed.

If the user determines to change the segment 325, the user may select an edit button 330 from a dropdown menu of options of actions associated with the segment 325. By selecting the edit button 330, the user may effectively indicate to the communication process flow management service 310 that the segment 325 on which the communication process flow 320 is to be executed has been updated. In some examples, the communication process flow management service 310 may receive an input via the user interface of the browser tab 305-*a* to update the segment 325.

Based on the user selecting the edit button 330, the user interface 300 may display the browser tab 305-*b*, which may show a user interface of the entity segmentation service 315. As the user interface 300 may now include two browser tabs 305, the user may effectively switch from the browser tab 305-*a* displaying the user interface of the communication process flow management service 310 to the browser tab 305-*b* displaying the user interface of the entity segmentation service 315 based on receiving the indication of the update (e.g., the user selecting the edit button 330). Alternatively, the browser tab 305-*b* may be opened for accessing the entity segmentation service 315 based on the communication process flow management service 310 receiving the input via the user interface of the browser tab 305-*a*. In some other examples, the user interface of the communication process flow management service 310 may be displayed in a same browser tab as the user interface of the entity segmentation service 315. That is, instead of the entity segmentation service 315 being associated with a new browser tab 305-*b*, the user interface of the entity segmentation service 315 may be displayed as a popup or some other format within the browser tab 305-*a*.

The browser tab 305-*b* may display the segment 325 in a way such that the user may edit the segment 325 using the entity segmentation service 315. For example, the user may select one or more configuration options associated with a rule 335-*a*, a rule 335-*b*, a rule 335-*c*, and any other quantity of rules configurable for the segment 325. For example, the rule 335-*a* may correspond to a quantity of times a customer visited a website during a given time period. After making the desired updates to the segment 325, the user may select a save button 340, at which point the user may navigate back to the browser tab 305-*a*. That is, after the user saving updates to the segment 325, the user interface 300 may automatically switch back to the browser tab 305-*a*.

The communication process flow management service 310, via its user interface in the browser tab 305-*a*, may display a notification 345 indicating that the segment has been updated (in response to receiving a communication from the entity segmentation service, as described herein). The notification 345 may be a toast popup or some other banner message. In some examples, the entity segmentation service 315 may also display the notification via the corresponding user interface in the browser tab 305-*b*. When the notification 345 is displayed to the user in the browser tab 305-*a*, the browser tab 305-*b*, or both, the changes to the segment 325 may be automatically reflected in the communication process flow 320.

Figure 4:
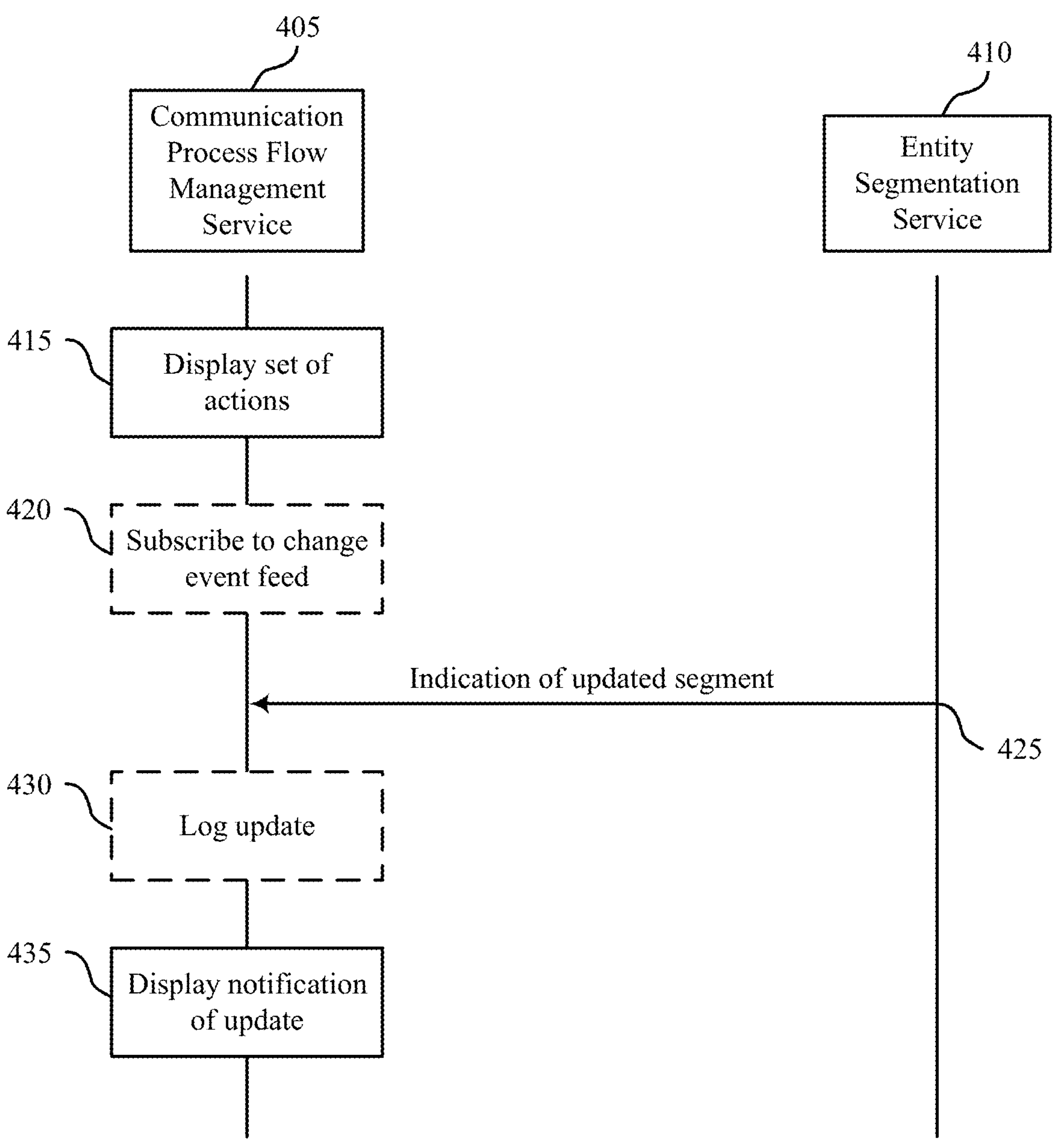
FIG. 4 illustrates an example of a process flow that supports cross-platform data refresh for communication process flows in accordance with aspects of the present disclosure.

FIG. 4 illustrates an example of a process flow 400 that supports cross-platform data refresh for communication process flows in accordance with aspects of the present disclosure. The process flow 400 may implement or be implemented by aspects of the data processing system 100 or the computing architecture 200. For example, the process flow 400 may include a communication process flow management service 405 and an entity segmentation service 410, which may be examples of corresponding services and platforms described with reference to FIGS. 1 and 2. In the following description of the process flow 400, operations between the communication process flow management service 405 and the entity segmentation service 410 may be performed in a different order or at a different time than as shown. Additionally, or alternatively, some operations may be omitted from the process flow 400, and other operations may be added to the process flow 400. The process flow 400 may support techniques for improved integration between the communication process flow management service 405 and the entity segmentation service 410.

At 415, the communication process flow management service 405 may display, at a user interface of the communication process flow management service 405, a set of actions associated with a communication process flow supported by the communication process flow management service 405, the communication process flow configured to manage communications between a tenant of a multi-tenant system that supports the communication process flow management service 405 and a segment of entities associated with the tenant. The actions may include email sends, decision splits, etc.

At 420, the communication process flow management service 405 may subscribe to a change event feed associated with the segment of entities. In some cases, the subscription may be via a service layer or via a CDC feed.

At 425, the communication process flow management service 405 may receive, from the entity segmentation service 410 that is separate from the communication process flow management service 405, an indication that the segment of entities on which the communication process flow is to be executed is updated via the entity segmentation service 410, where the entity segmentation service 410 supports a data model including a set of entities associated with the tenant and a set of attributes that are used to generate the segment of entities. In updating the segment of entities using the entity segmentation service 410, a user may navigate from a first browser tab associated with the communication process flow management service 405 to a second browser tab associated with the entity segmentation service 410.

At 430, the communication process flow management service 405 may log one or more updates to the segment of entities in response to receiving the indication. For example, the communication process flow management service 405 may log the current update and any previous updates from the same or different users.

At 435, the communication process flow management service 405 may display, at the user interface, a notification indicating that the segment of entities is updated. For example, the notification may include a toast popup, a banner message, or some other notification of the current update or any previous updates that the communication process flow management service 405 logged.

Figure 5:
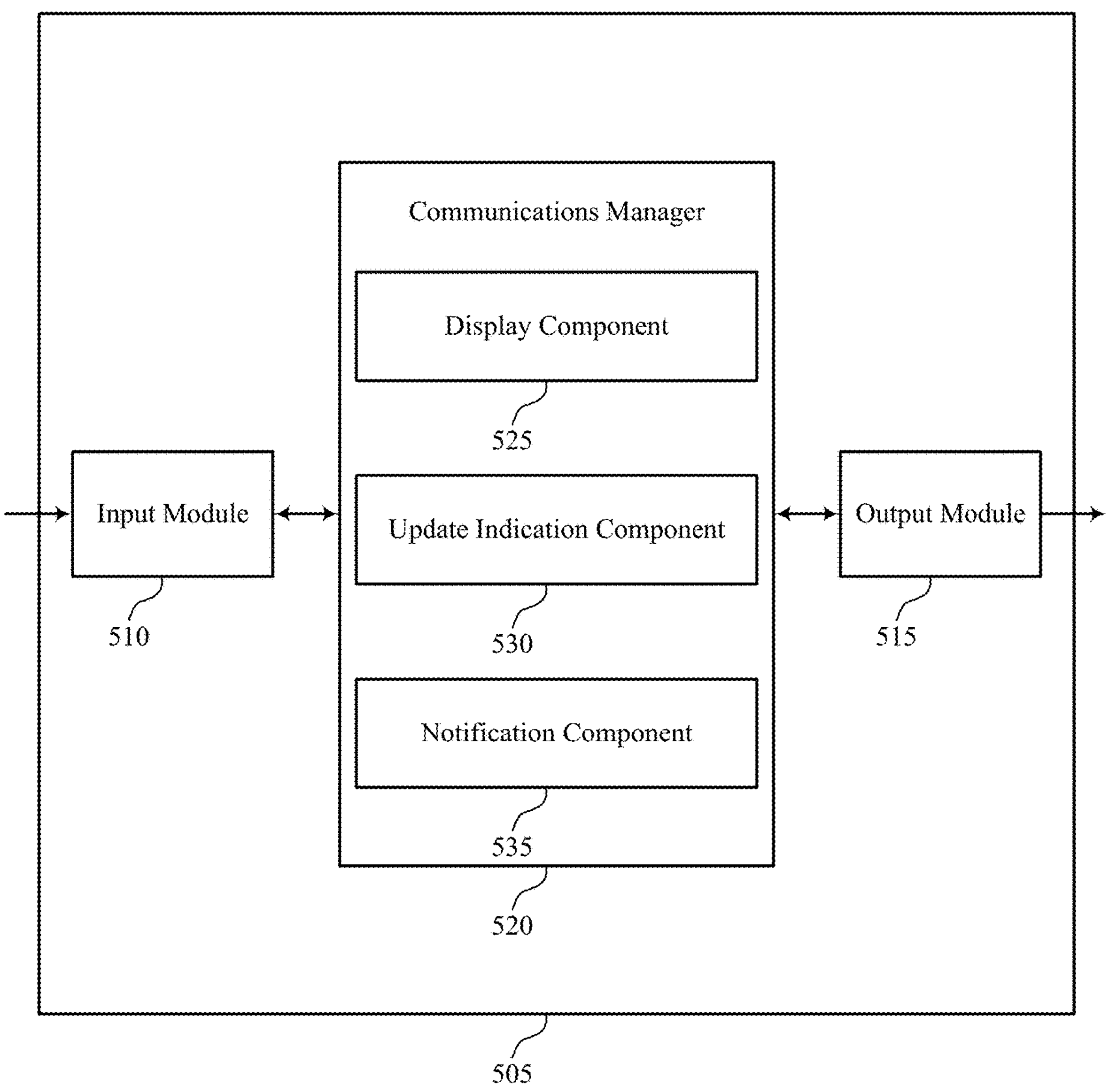
FIG. 5 illustrates a block diagram of an apparatus that supports cross-platform data refresh for communication process flows in accordance with aspects of the present disclosure.

FIG. 5 illustrates a block diagram 500 of a device 505 that supports cross-platform data refresh for communication process flows in accordance with aspects of the present disclosure. The device 505 may include an input module 510, an output module 515, and a communications manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the communications manager 520 to support cross-platform data refresh for communication process flows. In some cases, the input module 510 may be a component of an I/O controller 710 as described with reference to FIG. 7.

The output module 515 may manage output signals for the device 505. For example, the output module 515 may receive signals from other components of the device 505, such as the communications manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the communications manager 520 may include a display component 525, an update indication component 530, a notification component 535, or any combination thereof. In some examples, the communications manager 520, or various components thereof, may be configured to perform various operations (e.g., receiving, monitoring, transmitting) using or otherwise in cooperation with the input module 510, the output module 515, or both. For example, the communications manager 520 may receive information from the input module 510, send information to the output module 515, or be integrated in combination with the input module 510, the output module 515, or both to receive information, transmit information, or perform various other operations as described herein.

The communications manager 520 may support data processing at a communication process flow management service in accordance with examples as disclosed herein. The display component 525 may be configured to support displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant. The update indication component 530 may be configured to support receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities. The notification component 535 may be configured to support displaying, at the user interface, a notification indicating that the segment of entities is updated.

Figure 6:
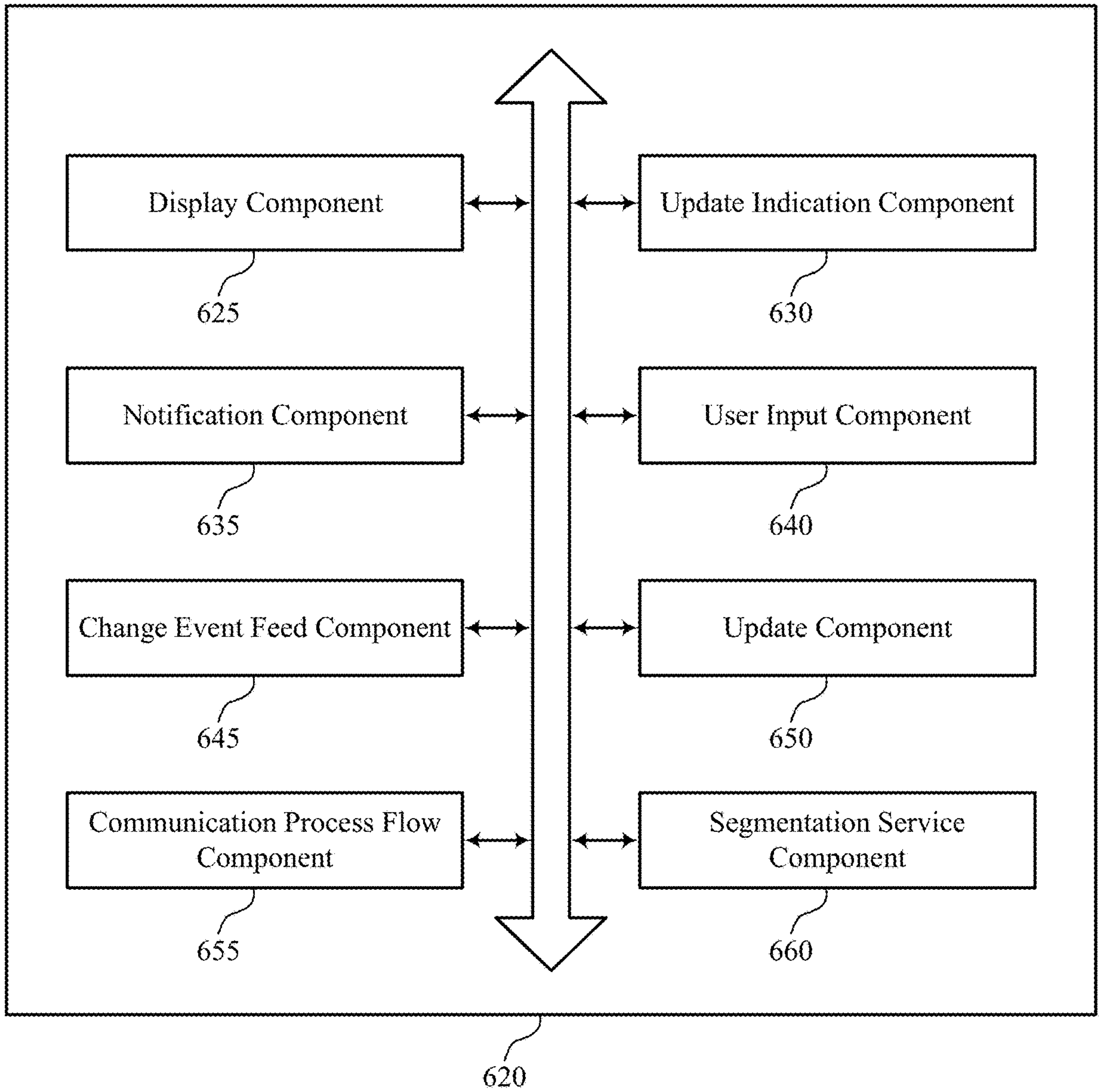
FIG. 6 illustrates a block diagram of a communications manager that supports cross-platform data refresh for communication process flows in accordance with aspects of the present disclosure.

FIG. 6 illustrates a block diagram 600 of a communications manager 620 that supports cross-platform data refresh for communication process flows in accordance with aspects of the present disclosure. The communications manager 620 may be an example of aspects of a communications manager or a communications manager 520, or both, as described herein. The communications manager 620, or various components thereof, may be an example of means for performing various aspects of cross-platform data refresh for communication process flows as described herein. For example, the communications manager 620 may include a display component 625, an update indication component 630, a notification component 635, a user input component 640, a change event feed component 645, an update component 650, a communication process flow component 655, a segmentation service component 660, or any combination thereof. Each of these components may communicate, directly or indirectly, with one another (e.g., via one or more buses).

The communications manager 620 may support data processing at a communication process flow management service in accordance with examples as disclosed herein. The display component 625 may be configured to support displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant. The update indication component 630 may be configured to support receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities. The notification component 635 may be configured to support displaying, at the user interface, a notification indicating that the segment of entities is updated.

In some examples, the user input component 640 may be configured to support receiving, the user interface, a user input indicating a selection of the segment of entities on which the communication process flow management service is to be executed.

In some examples, the change event feed component 645 may be configured to support subscribing to a change event feed associated with the segment of entities, where receiving the indication is based on subscribing to the change event feed.

In some examples, to support receiving the indication, the update indication component 630 may be configured to support receiving the indication from a service layer, where subscribing to the change event feed is via the service layer.

In some examples, the update component 650 may be configured to support updating the set of actions associated with the communication process flow based on receiving the indication.

In some examples, the communication process flow component 655 may be configured to support executing the communication process flow on the updated segment of entities. In some examples, the update indication component 630 may be configured to support logging one or more updates to the segment of entities in response to receiving the indication.

In some examples, the segmentation service component 660 may be configured to support switching from a first browser tab displaying the user interface of the communication process flow management service to a second browser tab displaying a user interface of the entity segmentation service based on receiving the indication. In some examples, the user interface of the communication process flow management service is displayed in a same browser tab as a user interface of the entity segmentation service.

In some examples, the update indication component 630 may be configured to support receiving an indication that an action of the set of actions associated with the communication process flow is updated based on the segment of entities being updated.

In some examples, the update indication component 630 may be configured to support receiving an indication that an email object associated with the communication process flow is updated based on the segment of entities being updated.

In some examples, the notification indicates a time stamp corresponding to when the segment of entities is updated, a user identifier corresponding to a user who updated the segment of entities, one or more fields associated with the segment of entities that are updated, a record identifier, a type of update, or any combination thereof.

In some examples, the update component 650 may be configured to support receiving, at the user interface, an input to update the segment of entities, where the segment of entities is updated based on receiving the input. In some examples, the update component 650 may be configured to support opening a browser tab for accessing the entity segmentation service based on receiving the input.

Figure 7:
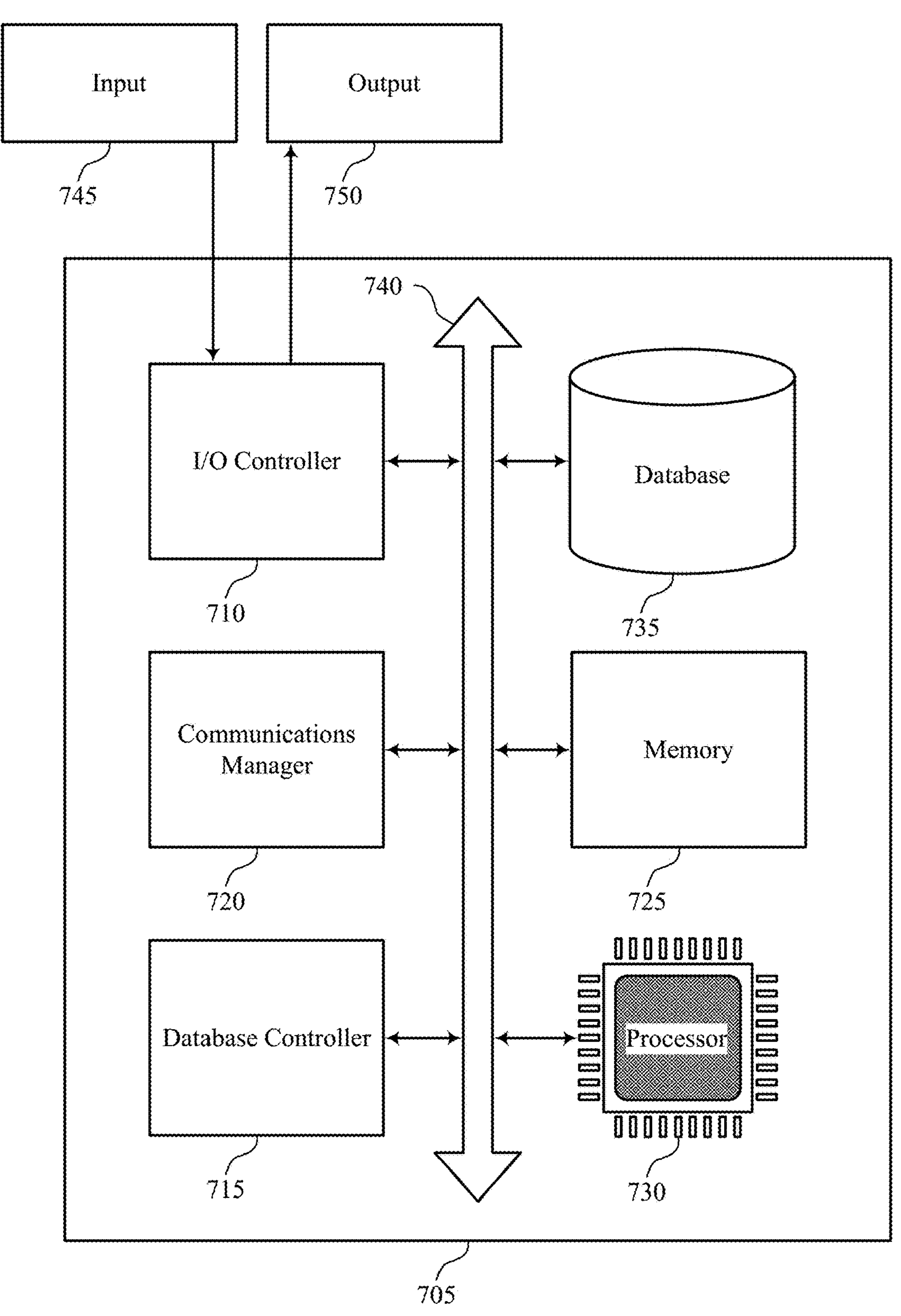
FIG. 7 illustrates a diagram of a system including a device that supports cross-platform data refresh for communication process flows in accordance with aspects of the present disclosure.

FIG. 7 illustrates a diagram of a system 700 including a device 705 that supports cross-platform data refresh for communication process flows in accordance with aspects of the present disclosure. The device 705 may be an example of or include the components of a device 505 as described herein. The device 705 may include components for bi-directional data communications including components for transmitting and receiving communications, such as a communications manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting cross-platform data refresh for communication process flows).

The communications manager 720 may support data processing at a communication process flow management service in accordance with examples as disclosed herein. For example, the communications manager 720 may be configured to support displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant. The communications manager 720 may be configured to support receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities. The communications manager 720 may be configured to support displaying, at the user interface, a notification indicating that the segment of entities is updated.

By including or configuring the communications manager 720 in accordance with examples as described herein, the device 705 may support techniques for cross-platform data refresh for communication process flows, which may improve workflow efficiencies and organization, increase visibility, increase workflow context, and improve customer experience.

FIG. 8 illustrates a flowchart showing a method 800 that supports cross-platform data refresh for communication process flows in accordance with aspects of the present disclosure. The operations of the method 800 may be implemented by a Communications Manager or its components as described herein. For example, the operations of the method 800 may be performed by a Communications Manager as described with reference to FIGS. 1 through 7. In some examples, a Communications Manager may execute a set of instructions to control the functional elements of the Communications Manager to perform the described functions. Additionally, or alternatively, the Communications Manager may perform aspects of the described functions using special-purpose hardware.

At 805, the method may include displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant. The operations of 805 may be performed in accordance with examples as disclosed herein. In some examples, aspects of the operations of 805 may be performed by a display component 625 as described with reference to FIG. 6.

At 810, the method may include receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities. The operations of 810 may be performed in accordance with examples as disclosed herein. In some examples, aspects of the operations of 810 may be performed by an update indication component 630 as described with reference to FIG. 6.

At 815, the method may include displaying, at the user interface, a notification indicating that the segment of entities is updated. The operations of 815 may be performed in accordance with examples as disclosed herein. In some examples, aspects of the operations of 815 may be performed by a notification component 635 as described with reference to FIG. 6.

Figure 9:
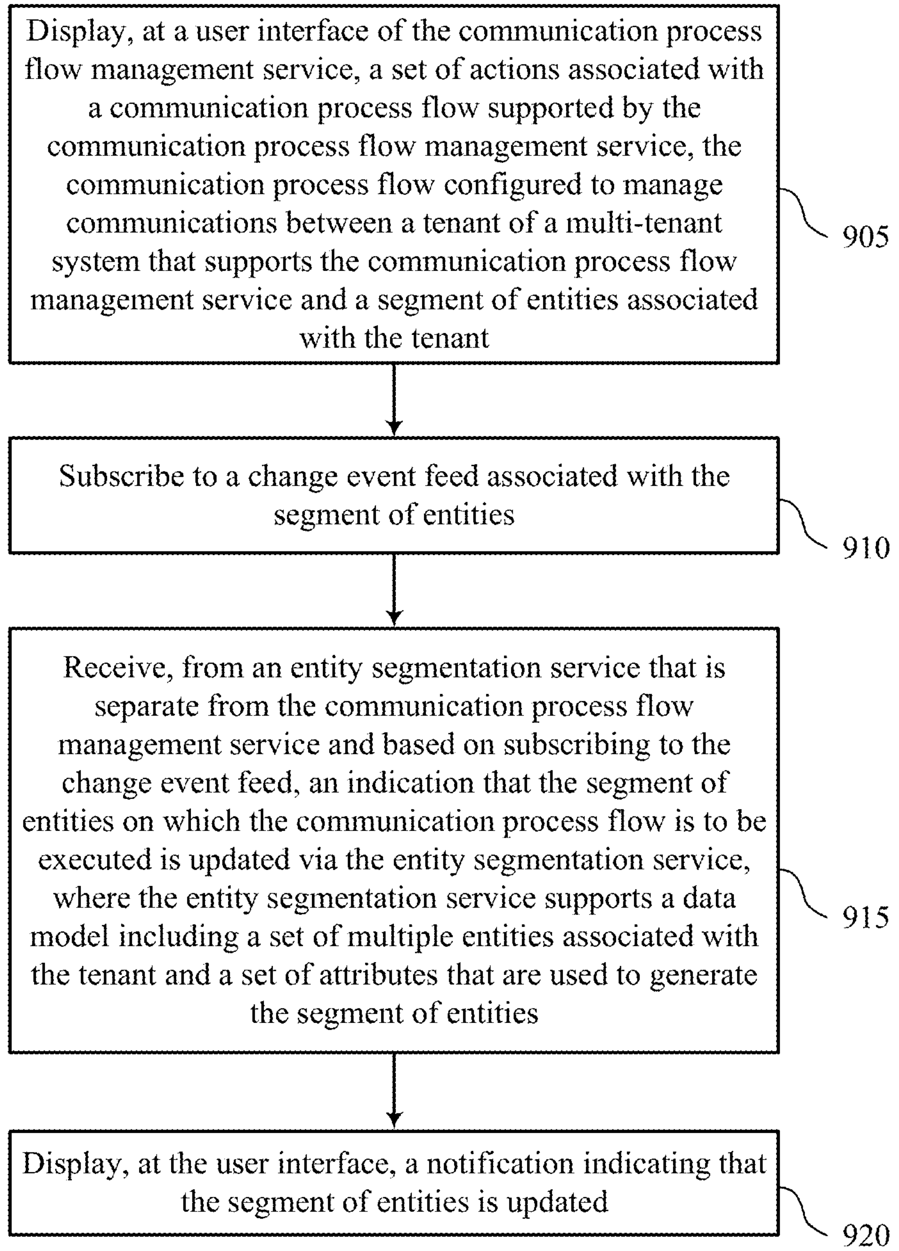

FIG. 9 illustrates a flowchart showing a method 900 that supports cross-platform data refresh for communication process flows in accordance with aspects of the present disclosure. The operations of the method 900 may be implemented by a Communications Manager or its components as described herein. For example, the operations of the method 900 may be performed by a Communications Manager as described with reference to FIGS. 1 through 7. In some examples, a Communications Manager may execute a set of instructions to control the functional elements of the Communications Manager to perform the described functions. Additionally, or alternatively, the Communications Manager may perform aspects of the described functions using special-purpose hardware.

At 905, the method may include displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant. The operations of 905 may be performed in accordance with examples as disclosed herein. In some examples, aspects of the operations of 905 may be performed by a display component 625 as described with reference to FIG. 6.

At 910, the method may include subscribing to a change event feed associated with the segment of entities. The operations of 910 may be performed in accordance with examples as disclosed herein. In some examples, aspects of the operations of 910 may be performed by a change event feed component 645 as described with reference to FIG. 6.

At 915, the method may include receiving, from an entity segmentation service that is separate from the communication process flow management service and based on subscribing to the change event feed, an indication that the segment of entities on which the communication process flow is to be executed is updated via the entity segmentation service, where the entity segmentation service supports a data model including a set of multiple entities associated with the tenant and a set of attributes that are used to generate the segment of entities. The operations of 915 may be performed in accordance with examples as disclosed herein. In some examples, aspects of the operations of 915 may be performed by an update indication component 630 as described with reference to FIG. 6.

At 920, the method may include displaying, at the user interface, a notification indicating that the segment of entities is updated. The operations of 920 may be performed in accordance with examples as disclosed herein. In some examples, aspects of the operations of 920 may be performed by a notification component 635 as described with reference to FIG. 6.

Figure 10:
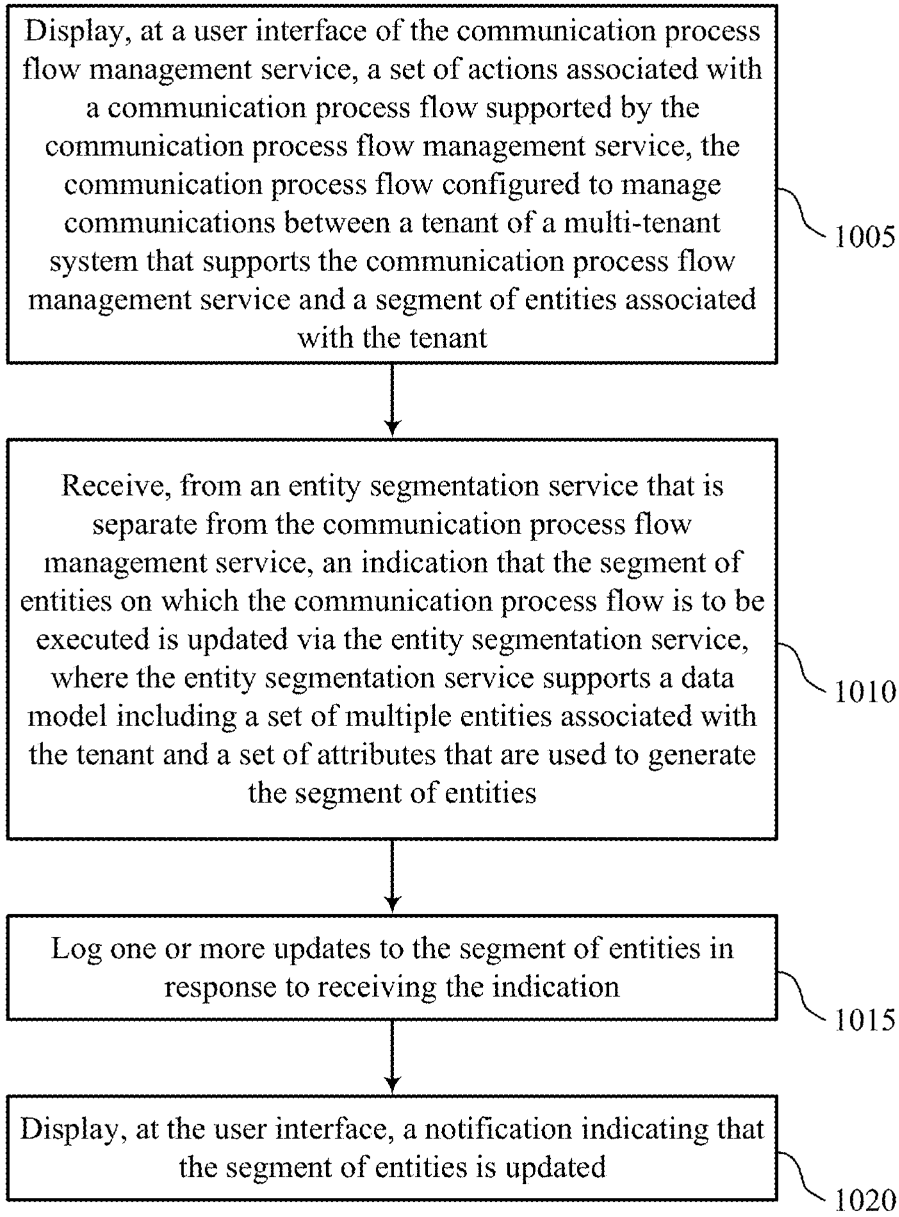

FIG. 10 illustrates a flowchart showing a method 1000 that supports cross-platform data refresh for communication process flows in accordance with aspects of the present disclosure. The operations of the method 1000 may be implemented by a Communications Manager or its components as described herein. For example, the operations of the method 1000 may be performed by a Communications Manager as described with reference to FIGS. 1 through 7. In some examples, a Communications Manager may execute a set of instructions to control the functional elements of the Communications Manager to perform the described functions. Additionally, or alternatively, the Communications Manager may perform aspects of the described functions using special-purpose hardware.

At 1005, the method may include displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant. The operations of 1005 may be performed in accordance with examples as disclosed herein. In some examples, aspects of the operations of 1005 may be performed by a display component 625 as described with reference to FIG. 6.

At 1010, the method may include receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities. The operations of 1010 may be performed in accordance with examples as disclosed herein. In some examples, aspects of the operations of 1010 may be performed by an update indication component 630 as described with reference to FIG. 6.

At 1015, the method may include logging one or more updates to the segment of entities in response to receiving the indication. The operations of 1015 may be performed in accordance with examples as disclosed herein. In some examples, aspects of the operations of 1015 may be performed by an update indication component 630 as described with reference to FIG. 6.

At 1020, the method may include displaying, at the user interface, a notification indicating that the segment of entities is updated. The operations of 1020 may be performed in accordance with examples as disclosed herein. In some examples, aspects of the operations of 1020 may be performed by a notification component 635 as described with reference to FIG. 6.

A method for data processing at a communication process flow management service is described. The method may include displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant, receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities, and displaying, at the user interface, a notification indicating that the segment of entities is updated.

An apparatus for data processing at a communication process flow management service is described. The apparatus may include a processor, memory coupled with the processor, and instructions stored in the memory. The instructions may be executable by the processor to cause the apparatus to display, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant, receive, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities, and display, at the user interface, a notification indicating that the segment of entities is updated.

Another apparatus for data processing at a communication process flow management service is described. The apparatus may include means for displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant, means for receiving, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities, and means for displaying, at the user interface, a notification indicating that the segment of entities is updated.

A non-transitory computer-readable medium storing code for data processing at a communication process flow management service is described. The code may include instructions executable by a processor to display, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant, receive, from an entity segmentation service that is separate from the communication process flow management service, an indication that the segment of entities on which the communication process flow is to be executed is updated via the entity segmentation service, where the entity segmentation service supports a data model including a set of multiple entities associated with the tenant and a set of attributes that are used to generate the segment of entities, and display, at the user interface, a notification indicating that the segment of entities is updated.

Some examples of the method, apparatuses, and non-transitory computer-readable medium described herein may further include operations, features, means, or instructions for receiving, the user interface, a user input indicating a selection of the segment of entities on which the communication process flow management service may be executed.

Some examples of the method, apparatuses, and non-transitory computer-readable medium described herein may further include operations, features, means, or instructions for subscribing to a change event feed associated with the segment of entities, where receiving the indication may be based on subscribing to the change event feed.

In some examples of the method, apparatuses, and non-transitory computer-readable medium described herein, receiving the indication may include operations, features, means, or instructions for receiving the indication from a service layer, where subscribing to the change event feed may be via the service layer.

Some examples of the method, apparatuses, and non-transitory computer-readable medium described herein may further include operations, features, means, or instructions for updating the set of actions associated with the communication process flow based on receiving the indication.

Some examples of the method, apparatuses, and non-transitory computer-readable medium described herein may further include operations, features, means, or instructions for executing the communication process flow on the updated segment of entities.

Some examples of the method, apparatuses, and non-transitory computer-readable medium described herein may further include operations, features, means, or instructions for logging one or more updates to the segment of entities in response to receiving the indication.

Some examples of the method, apparatuses, and non-transitory computer-readable medium described herein may further include operations, features, means, or instructions for switching from a first browser tab displaying the user interface of the communication process flow management service to a second browser tab displaying a user interface of the entity segmentation service based on receiving the indication.

In some examples of the method, apparatuses, and non-transitory computer-readable medium described herein, the user interface of the communication process flow management service may be displayed in a same browser tab as a user interface of the entity segmentation service.

Some examples of the method, apparatuses, and non-transitory computer-readable medium described herein may further include operations, features, means, or instructions for receiving an indication that an action of the set of actions associated with the communication process flow may be updated based on the segment of entities being updated.

Some examples of the method, apparatuses, and non-transitory computer-readable medium described herein may further include operations, features, means, or instructions for receiving an indication that an email object associated with the communication process flow may be updated based on the segment of entities being updated.

In some examples of the method, apparatuses, and non-transitory computer-readable medium described herein, the notification indicates a time stamp corresponding to when the segment of entities may be updated, a user identifier corresponding to a user who updated the segment of entities, one or more fields associated with the segment of entities that may be updated, a record identifier, a type of update, or any combination thereof.

Some examples of the method, apparatuses, and non-transitory computer-readable medium described herein may further include operations, features, means, or instructions for receiving, at the user interface, an input to update the segment of entities, where the segment of entities may be updated based on receiving the input.

Some examples of the method, apparatuses, and non-transitory computer-readable medium described herein may further include operations, features, means, or instructions for opening a browser tab for accessing the entity segmentation service based on receiving the input.

The following provides an overview of aspects of the present disclosure:

Aspect 1: A method for data processing at a communication process flow management service, comprising: displaying, at a user interface of the communication process flow management service, a set of actions associated with a communication process flow supported by the communication process flow management service, the communication process flow configured to manage communications between a tenant of a multi-tenant system that supports the communication process flow management service and a segment of entities associated with the tenant: receiving, from an entity segmentation service that is separate from the communication process flow management service, an indication that the segment of entities on which the communication process flow is to be executed is updated via the entity segmentation service, wherein the entity segmentation service supports a data model including a plurality of entities associated with the tenant and a set of attributes that are used to generate the segment of entities: and displaying, at the user interface, a notification indicating that the segment of entities is updated.

Aspect 2: The method of aspect 1, further comprising: receiving, the user interface, a user input indicating a selection of the segment of entities on which the communication process flow management service is to be executed.

Aspect 3: The method of any of aspects 1 through 2, further comprising: subscribing to a change event feed associated with the segment of entities, wherein receiving the indication is based at least in part on subscribing to the change event feed.

Aspect 4: The method of any of aspects 1 through 3, wherein receiving the indication comprises: receiving the indication from a service layer, wherein subscribing to the change event feed is via the service layer.

Aspect 5: The method of any of aspects 1 through 4, further comprising: updating the set of actions associated with the communication process flow based at least in part on receiving the indication.

Aspect 6: The method of any of aspects 1 through 5, further comprising: executing the communication process flow on the updated segment of entities.

Aspect 7: The method of any of aspects 1 through 6, further comprising: logging one or more updates to the segment of entities in response to receiving the indication.

Aspect 8: The method of any of aspects 1 through 7, further comprising: switching from a first browser tab displaying the user interface of the communication process flow management service to a second browser tab displaying a user interface of the entity segmentation service based at least in part on receiving the indication.

Aspect 9: The method of any of aspects 1 through 8, wherein the user interface of the communication process flow management service is displayed in a same browser tab as a user interface of the entity segmentation service.

Aspect 10: The method of any of aspects 1 through 9, further comprising: receiving an indication that an action of the set of actions associated with the communication process flow is updated based at least in part on the segment of entities being updated.

Aspect 11: The method of any of aspects 1 through 10, further comprising: receiving an indication that an email object associated with the communication process flow is updated based at least in part on the segment of entities being updated.

Aspect 12: The method of any of aspects 1 through 11, wherein the notification indicates a time stamp corresponding to when the segment of entities is updated, a user identifier corresponding to a user who updated the segment of entities, one or more fields associated with the segment of entities that are updated, a record identifier, a type of update, or any combination thereof.

Aspect 13: The method of any of aspects 1 through 12, further comprising: receiving, at the user interface, an input to update the segment of entities, wherein the segment of entities is updated based at least in part on receiving the input.

Aspect 14: The method of aspect 13, further comprising: opening a browser tab for accessing the entity segmentation service based at least in part on receiving the input.

Aspect 15: An apparatus for data processing at a communication process flow management service, comprising a processor: memory coupled with the processor: and instructions stored in the memory and executable by the processor to cause the apparatus to perform a method of any of aspects 1 through 14.

Aspect 16: An apparatus for data processing at a communication process flow management service, comprising at least one means for performing a method of any of aspects 1 through 14.

Aspect 17: A non-transitory computer-readable medium storing code for data processing at a communication process flow management service, the code comprising instructions executable by a processor to perform a method of any of aspects 1 through 14.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a communication process flow management service, comprising:

displaying, at a user interface of the communication process flow management service, a set of actions associated with a communication process flow supported by the communication process flow management service, the communication process flow configured to manage communications between a tenant of a multi-tenant system that supports the communication process flow management service and a segment of users stored in a data model associated with the tenant;

receiving, at the user interface, a user input indicating a selection of the segment of users on which the communication process flow is to be executed;

receiving, from an entity segmentation service that is separate from the communication process flow management service, an indication that the segment of users on which the communication process flow is to be executed is updated via the entity segmentation service, wherein the entity segmentation service supports the data model including a plurality of users associated with the tenant and a set of attributes that are used to generate the segment of users, wherein receiving the indication is based at least in part on receiving, at the user interface, the user input indicating the selection of the segment of users; and displaying, at the user interface and based at least in part on receiving the indication from the entity segmentation service, a notification indicating that the segment of users is updated.

2. The method of claim 1, further comprising:

subscribing to a change event feed associated with the segment of users, wherein receiving the indication is based at least in part on subscribing to the change event feed.

3. The method of claim 2, wherein receiving the indication comprises:

receiving the indication from a service layer, wherein subscribing to the change event feed is via the service layer.

4. The method of claim 1, further comprising:

updating the set of actions associated with the communication process flow based at least in part on receiving the indication.

5. The method of claim 1, further comprising:

executing the communication process flow on the updated segment of users.

6. The method of claim 1, further comprising:

logging one or more updates to the segment of users in response to receiving the indication.

7. The method of claim 1, further comprising:

switching from a first browser tab displaying the user interface of the communication process flow management service to a second browser tab displaying a user interface of the entity segmentation service based at least in part on receiving the indication.

8. The method of claim 1, wherein the user interface of the communication process flow management service is displayed in a same browser tab as a user interface of the entity segmentation service.

9. The method of claim 1, further comprising:
receiving an indication that an action of the set of actions associated with the communication process flow is updated based at least in part on the segment of users being updated.

10. The method of claim 1, further comprising:
receiving an indication that an email object associated with the communication process flow is updated based at least in part on the segment of users being updated.

11. The method of claim 1, wherein the notification indicates a time stamp corresponding to when the segment of users is updated, a user identifier corresponding to a user who updated the segment of users, one or more fields associated with the segment of users that are updated, a record identifier, a type of update, or any combination thereof.

12. The method of claim 1, further comprising:
receiving, at the user interface, an input to update the segment of users, wherein the segment of users is updated based at least in part on receiving the input.

13. The method of claim 12, further comprising:
opening a browser tab for accessing the entity segmentation service based at least in part on receiving the input.

14. An apparatus for data processing at a communication process flow management service, comprising:
a processor;
memory coupled with the processor; and
instructions stored in the memory and executable by the processor to cause the apparatus to:
display, at a user interface of the communication process flow management service, a set of actions associated with a communication process flow supported by the communication process flow management service, the communication process flow configured to manage communications between a tenant of a multi-tenant system that supports the communication process flow management service and a segment of users stored in a data model associated with the tenant;
receive, at the user interface, a user input indicating a selection of the segment of users on which the communication process flow is to be executed;
receive, from an entity segmentation service that is separate from the communication process flow management service, an indication that the segment of users on which the communication process flow is to be executed is updated via the entity segmentation service, wherein the entity segmentation service supports the data model including a plurality of users associated with the tenant and a set of attributes that are used to generate the segment of users, wherein receiving the indication is based at least in part on receiving, at the user interface, the user input indicating the selection of the segment of users; and
display, at the user interface and based at least in part on receiving the indication from the entity segmentation service, a notification indicating that the segment of users is updated.

15. The apparatus of claim 14, wherein the instructions are further executable by the processor to cause the apparatus to:
subscribe to a change event feed associated with the segment of users, wherein receiving the indication is based at least in part on subscribing to the change event feed.

16. The apparatus of claim 15, wherein the instructions to receive the indication are executable by the processor to cause the apparatus to:
receive the indication from a service layer, wherein subscribing to the change event feed is via the service layer.

17. The apparatus of claim 14, wherein the instructions are further executable by the processor to cause the apparatus to:
update the set of actions associated with the communication process flow based at least in part on receiving the indication.

18. A non-transitory computer-readable medium storing code for data processing at a communication process flow management service, the code comprising instructions executable by a processor to:
display, at a user interface of the communication process flow management service, a set of actions associated with a communication process flow supported by the communication process flow management service, the communication process flow configured to manage communications between a tenant of a multi-tenant system that supports the communication process flow management service and a segment of users stored in a data model associated with the tenant;
receive, at the user interface of the communication process flow management service, a user input indicating a selection of the segment of users on which the communication process flow is to be executed;
receive, from an entity segmentation service that is separate from the communication process flow management service, an indication that the segment of users on which the communication process flow is to be executed is updated via the entity segmentation service, wherein the entity segmentation service supports the data model including a plurality of users associated with the tenant and a set of attributes that are used to generate the segment of users, wherein receiving the indication is based at least in part on receiving, at the user interface, the user input indicating the selection of the segment of users; and
display, at the user interface and based at least in part on receiving the indication from the entity segmentation service, a notification indicating that the segment of users is updated.

* * * * *